(12) United States Patent
Wang (10) Patent No.: US 9,489,710 B2
(45) Date of Patent: Nov. 8, 2016

(54) HYBRID RENDERING IN GRAPHICS PROCESSING

(71) Applicant: QUALCOMM Incorporated, San Diego, CA (US)

(72) Inventor: Tao Wang, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 14/618,463

(22) Filed: Feb. 10, 2015

(65) Prior Publication Data

US 2016/0232645 A1   Aug. 11, 2016

(51) Int. Cl.
| | |
|---|---|
| G06T 1/00 | (2006.01) |
| G06T 1/60 | (2006.01) |
| G06T 1/20 | (2006.01) |
| G06T 15/80 | (2011.01) |
| G06T 15/04 | (2011.01) |

(52) U.S. Cl.
CPC . *G06T 1/60* (2013.01); *G06T 1/20* (2013.01); *G06T 15/04* (2013.01); *G06T 15/80* (2013.01); *G06T 2200/28* (2013.01)

(58) Field of Classification Search
CPC ......... G06T 15/005; G06T 1/60; G06T 1/20; G06T 11/40; G06T 15/40; G06T 15/04; G06T 15/405; G06T 15/80; G06T 15/00; G06T 2200/28; G06T 13/20; G06T 17/005; G06T 2210/36; G06T 9/001; G06T 11/001; G06T 15/503; G06T 17/10; G06T 2200/04; G06T 2210/62; G06F 12/0223; G06F 9/383; G06F 9/3867; G06F 9/3877; G06F 9/3879; G09G 5/39
See application file for complete search history.

(56) References Cited

U.S. PATENT DOCUMENTS

| | | | |
|---|---|---|---|
| 5,664,162 A | 9/1997 | Dye | |
| 7,170,515 B1* | 1/2007 | Zhu | G06T 15/005 345/422 |
| 8,416,238 B2* | 4/2013 | Novosad | G06T 15/005 345/418 |
| 8,810,590 B2* | 8/2014 | Oat | G06T 13/20 345/530 |
| 9,367,953 B2* | 6/2016 | Nystad | G06T 15/40 |
| 2001/0020941 A1 | 9/2001 | Reynolds | |
| 2002/0113786 A1 | 8/2002 | Morein | |
| 2006/0098021 A1 | 5/2006 | Rim et al. | |
| 2007/0298885 A1 | 12/2007 | Tran | |
| 2009/0091569 A1* | 4/2009 | Nordlund | G06T 11/40 345/422 |

(Continued)

OTHER PUBLICATIONS

International Search Report and Written Opinion from International Application No. PCT/US2016/013932 ISA/EPO, dated May 3, 2016, 11 pp.

(Continued)

*Primary Examiner* — Sultana M Zalalee
(74) *Attorney, Agent, or Firm* — Shumaker & Sieffert, P.A.

(57) ABSTRACT

This disclosure presents techniques and structures for graphics processing. In one example, a method of graphics processing may include rendering, with a graphics processing unit (GPU), one or more portions of a frame using one or more graphics operations, and writing, with the GPU, color data directly to a color buffer in a system memory in accordance with the one or more graphics operations. The method may further include writing, with the GPU, depth data to a depth buffer in a graphics memory in accordance with the one or more graphics operations, and resolving, with the GPU, the depth buffer in the graphics memory to the system memory when the rendering of the one or more portions of the frame is complete.

30 Claims, 7 Drawing Sheets

(56) References Cited

U.S. PATENT DOCUMENTS

| | | |
|---|---|---|
| 2012/0268465 A1 | 10/2012 | Inada |
| 2013/0050212 A1* | 2/2013 | Falco, Jr. ............... G06T 19/20 345/420 |
| 2013/0135322 A1 | 5/2013 | Seetharamaiah et al. |
| 2013/0265309 A1* | 10/2013 | Goel ...................... G06T 15/80 345/426 |
| 2014/0198119 A1* | 7/2014 | Seetharamaiah ....... G06T 11/40 345/581 |
| 2014/0292756 A1* | 10/2014 | Mantor ................ G06T 15/005 345/426 |

OTHER PUBLICATIONS

Response to Written Opinion dated May 3, 2016 from International Application No. PCT/US2016/013932, filed Aug. 3, 2016, 4 pp.

* cited by examiner

HYBRID RENDERING IN GRAPHICS PROCESSING

TECHNICAL FIELD

This disclosure relates to techniques for graphics processing, and more specifically to techniques for hybrid rendering mode in graphics processing.

BACKGROUND

Visual content for display, such as content for graphical user interfaces and video games, may be generated by a graphics processing unit (GPU). A GPU may convert two-dimensional or three-dimensional (3D) objects into a two-dimensional (2D) pixel representation that may be displayed. Converting information about 3D objects into a bit map that can be displayed is known as pixel rendering, and requires considerable memory and processing power. In the past, 3D graphics capability was available only on powerful workstations. However, now 3D graphics accelerators are commonly found in personal computers (PC), as well as in in embedded devices, such as smart phones, tablet computers, portable media players, portable video gaming consoles, and the like. Typically, embedded device have less computational power and memory capacity as compared to conventional PCs. As such, increased complexity in 3D graphics rendering techniques presents difficulties when implementing such techniques on an embedded system.

SUMMARY

In general, this disclosure describes techniques for a hybrid rendering mode in graphics processing. In particular, in some examples, this disclosure describes a hybrid rending mode which uses a binning pass to determine which primitives of a frame may touch or otherwise contribute to a bin of a scene. Rendering is then performed on the bin using only the triangles determined to touch the bin by the binning pass. During the rendering of the bin, values in a depth buffer are stored in on-chip, fast graphics memory (GMEM). Once the bin has been rendered, the values in the depth buffer are resolved to system memory. However, rather than also storing values in a color buffer (i.e., the buffer storing the color values of the pixels) in GMEM, and then resolving the color buffer to system memory when rendering of a bin is completed, the hybrid rendering techniques of this disclosure may write pixel values directly to a color buffer stored in system memory without using GMEM. Writing color buffer values directly to the system memory may be beneficial in situations where the color buffer is updated infrequently, or only once, during the rending of a bin.

In one example of the disclosure, a method of graphics processing comprises rendering, with a graphics processing unit (GPU), one or more portions of a frame using one or more graphics operations, writing, with the GPU, color data directly to a color buffer in a system memory in accordance with the one or more graphics operations, writing, with the GPU, depth data to a depth buffer in a graphics memory in accordance with the one or more graphics operations, and resolving, with the GPU, the depth buffer in the graphics memory to the system memory when the rendering of the one or more portions of the frame is complete.

In another example of the disclosure, an apparatus configured for graphics processing comprises a graphics memory configured to store the graphics data, a GPU in communication with the system memory and the graphics memory, the GPU configured to render one or more portions of the frame using one or more graphics operations, write color data directly to a color buffer in a system memory in accordance with the one or more graphics operations, write depth data to a depth buffer in the graphics memory in accordance with the one or more graphics operations, and resolve the depth buffer in the graphics memory to the system memory when the rendering of the one or more portions of the frame is complete.

In another example of the disclosure, an apparatus configured for graphics processing comprises means for rendering one or more portions of a frame using one or more graphics operations, means for writing color data directly to a color buffer in a system memory in accordance with the one or more graphics operations, means for writing depth data to a depth buffer in a graphics memory in accordance with the one or more graphics operations, and means for resolving the depth buffer in the graphics memory to the system memory when the rendering of the one or more portions of the frame is complete.

In another example, this disclosure describes a non-transitory computer-readable storage medium storing instructions that, when executed, cause one or more processors of a device configured for graphics processing to render one or more portions of the frame using one or more graphics operations, write color data directly to a color buffer in a system memory in accordance with the one or more graphics operations, write depth data to a depth buffer in a graphics memory in accordance with the one or more graphics operations, and resolve the depth buffer in the graphics memory to the system memory when the rendering of the one or more portions of the frame is complete.

The techniques of this disclosure are also described in terms of an apparatus and a computer-readable storage medium storing instructions for causing a processor to perform the techniques. The details of one or more examples are set forth in the accompanying drawings and the description below. Other features, objects, and advantages will be apparent from the description and drawings, and from the claims.

DETAILED DESCRIPTION

This disclosure relates to techniques for graphics processing, and more specifically to techniques for a hybrid rendering mode. Current graphics rendering systems typically use one of a binning rendering mode (sometimes called tile-based rendering) or a direct rendering mode to render a scene. In many examples, a graphics processing unit (GPU)

may be configured to selectively perform both binning rendering and tile-based rendering. In binning rendering, one frame of a 2D or 3D scene is rendered by breaking the frame into smaller parts (e.g., rectangular bins or tiles) and rendering each of these bins separately. Binning rendering is useful for applications where little dedicated fast graphics memory (GMEM) is available, such as for mobile applications. The size of the bins can be configured to represent the amount of storage that is available in the GMEM. For example, if the GMEM is able to store 512 kB, the size of a bin may be configured so that that pixel data contained in that bin is less than or equal to 512 kB.

The pixel data that may be stored in GMEM may include depth values of the pixels and color values of the pixels. The depth values for the pixels in the bin may be stored in a depth buffer in GMEM. Likewise, the color values for the pixels in the bin may be stored in a color buffer in GMEM. When rendering of a bin is finished, both the depth buffer and the color buffer may be resolved to system memory (e.g., to dynamic random-access memory (DRAM)). That is, resolving data from a buffer to system memory includes writing the values stored in the buffer (e.g., both the depth buffer and the color buffer) from GMEM to system memory. In this way, depth values and color values for the next bin may be stored in the depth buffer and color buffer in GMEM.

Graphics processing in a direct rendering mode, on the other hand, does not break a frame into smaller parts (e.g., bins or tiles). Instead, the entirety of a frame is rendered at once. In some graphics processing systems (e.g., a graphics processing system on a mobile device), there is not enough GMEM to hold an entire frame of pixel data. Instead, for a direct rendering mode, slower system memory is used to render the frame. As such, depth values and color values are written to a depth buffer and a color buffer, respectively, directly in a system memory.

Since direct rendering techniques utilize system memory to store the color buffer and the depth buffer, direct rendering techniques typically experience more memory traffic from system memory. Memory traffic between the GPU and system memory is typically slow, and thus limits GPU performance. In addition, memory traffic between the GPU and system memory consumes more power than memory traffic between the GPU and on-chip graphics memory.

Normally, binning rendering techniques experience less total memory traffic between the GPU and system memory than direct rendering, as binning rendering techniques use the GMEM for storing the color buffer and depth buffer. However, more and more applications and GPU architectures use depth tests, including advanced depth tests, to reduce the color read/write complexity. That is, performing graphics operations, such as shading, based on values in the depth buffer causes such shading to only be performed on pixels "closest" to the user. As such, fewer writes of pixel values to the color buffer are needed. If most pixels in a bin are written a few times (or just once) to the color buffer, writing pixels in the color buffer in GMEM and then resolving the color buffer out to system memory may result in lower memory performance than just writing pixels into the color buffer directly in system memory. That is, the use of GMEM provides the most advantages when color and/or depth values are written to the color buffer and the depth buffer in GMEM many times. Writing color values to GMEM only a few times per bin, and then resolving such values to system, may result in lower memory and power performance than simply writing the values to system memory directly.

In view of these drawbacks, this disclosure proposes a hybrid rendering system where pixel values are written into a color buffer directly in system memory (e.g., DRAM), and depth values are written into a depth buffer in GMEM. The hybrid rendering techniques of this disclosure may be used with or without binning techniques. Because depth complexity (i.e., the number of depth read/writes) is generally higher than color complexity (i.e., the number of pixel value read/writes), the techniques of this disclosure may save unnecessary color buffer resolves from GMEM to DRAM. That is, the hybrid rendering techniques of this disclosure provides for greater memory use efficiency for situations where pixel values are likely to be written to GMEM a few times, or only once, per bin.

Figure 1:
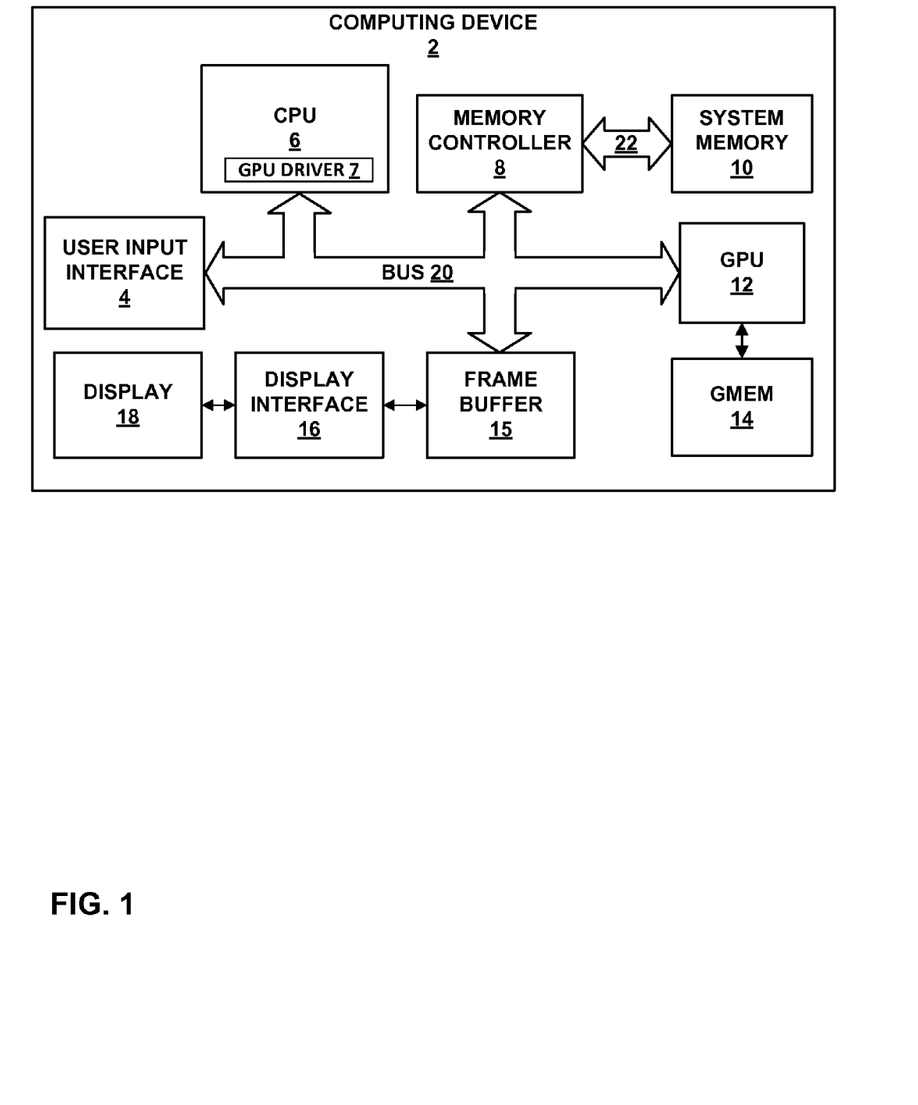
FIG. 1 is a block diagram showing an example computing device configured to use the techniques of this disclosure.

FIG. 1 is a block diagram illustrating an example computing device 2 that may be used to implement the techniques of this disclosure for performing a hybrid rendering mode. Computing device 2 may comprise, for example, a personal computer, a desktop computer, a laptop computer, a tablet computer, a computer workstation, a video game platform or console, a mobile telephone such as, e.g., a cellular or satellite telephone, a landline telephone, an Internet telephone, a handheld device such as a portable video game device or a personal digital assistant (PDA), a personal music player, a video player, a display device, a television, a television set-top box, a server, an intermediate network device, a mainframe computer, any mobile device, or any other type of device that processes and/or displays graphical data.

As illustrated in the example of FIG. 1, computing device 2 may include a user input interface 4, a central processing unit (CPU) 6, a memory controller 8, a system memory 10, a graphics processing unit (GPU) 12, a graphics memory (GMEM) 14, a display interface 16, a display 18 and buses 20 and 22. Note that in some examples, GMEM 14 may be "on-chip" with GPU 12. In some cases, all hardware elements show in FIG. 1 may be on-chip, for example, in a system on a chip (SoC) design. User input interface 4, CPU 6, memory controller 8, GPU 12 and display interface 16 may communicate with each other using bus 20. Memory controller 8 and system memory 10 may also communicate with each other using bus 22. Buses 20, 22 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. Additionally, CPU 6 may execute a GPU driver 7 for controlling the operation of GPU 12. The user may provide input to computing device 2 via one or more input devices (not shown) such as a keyboard, a mouse, a microphone, a touch pad or another input device that is coupled to computing device 2 via user input interface 4.

The software applications that execute on CPU 6 may include one or more graphics rendering instructions that instruct CPU 6 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 6 may issue one or more graphics rendering commands to GPU 12 (e.g., through GPU driver 7) to cause GPU 12 to perform some or all of the rendering of the graphics data. In some examples, the graphics data to be rendered may include a list of graphics primitives, e.g., points, lines, triangles, quadrilaterals, triangle strips, etc.

Memory controller 8 facilitates the transfer of data going into and out of system memory 10. For example, memory controller 8 may receive memory read and write commands, and service such commands with respect to system memory 10 in order to provide memory services for the components in computing device 2. Memory controller 8 is communicatively coupled to system memory 10 via memory bus 22. Although memory controller 8 is illustrated in FIG. 1 as being a processing module that is separate from both CPU 6 and system memory 10, in other examples, some or all of the functionality of memory controller 8 may be implemented on one or both of CPU 6 and system memory 10.

System memory 10 may store program modules and/or instructions that are accessible for execution by CPU 6 and/or data for use by the programs executing on CPU 6. For example, system memory 10 may store a window manager application that is used by CPU 6 to present a graphical user interface (GUI) on display 18. In addition, system memory 10 may store user applications and application surface data associated with the applications. System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store any combination of texture buffers, depth buffers, stencil buffers, vertex buffers, frame buffers, or the like. System memory 10 may include one or more volatile or non-volatile memories or storage devices, such as, for example, random-access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

GPU 12 may be configured to perform graphics operations to render one or more graphics primitives to display 18. Thus, when one of the software applications executing on CPU 6 requires graphics processing, CPU 6 may provide graphics commands and graphics data to GPU 12 for rendering to display 18. The graphics data may include, e.g., drawing commands, state information, primitive information, texture information, etc. GPU 12 may, in some instances, be built with a highly-parallel structure that provides more efficient processing of complex graphic-related operations than CPU 6. For example, GPU 12 may include a plurality of processing elements that are configured to operate on multiple vertices or pixels in a parallel manner.

The highly parallel nature of GPU 12 may, in some instances, allow GPU 12 to draw graphics images (e.g., GUIs and two-dimensional (2D) and/or three-dimensional (3D) graphics scenes) onto display 18 more quickly than drawing the scenes directly to display 18 using CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. GPU 12 may include one or more processors, such as one or more microprocessors, application specific integrated circuits (ASICs), field programmable gate arrays (FPGAs), digital signal processors (DSPs), or other equivalent integrated or discrete logic circuitry.

GPU 12 may be directly coupled to GMEM 14. Thus, GPU 12 may read data from and write data to GMEM 14 without using bus 20. In other words, GPU 12 may process data locally using a local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate memory, but instead utilize system memory 10 via bus 20. GMEM 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 6 and/or GPU 12 may store rendered image data in a frame buffer 15. Frame buffer 15 may be an independent memory or may be is allocated within system memory 10. Display interface 16 may retrieve the data from frame buffer 15 and configure display 18 to display the image represented by the rendered image data. In some examples, display interface 16 may include a digital-to-analog converter (DAC) that is configured to convert the digital values retrieved from the frame buffer into an analog signal consumable by display 18. In other examples, display interface 16 may pass the digital values directly to display 18 for processing. Display 18 may include a monitor, a television, a projection device, a liquid crystal display (LCD), a plasma display panel, a light emitting diode (LED) array, such as an organic LED (OLED) display, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone. Alternatively, display 18 may be a stand-alone device coupled to computing device 2 via a wired or wireless communications link. For instance, display 18 may be a computer monitor or flat panel display connected to a personal computer via a cable or wireless link.

According to one example of the disclosure, GPU 12 may be configured to render one or more portions of the frame using one or more graphics operations, and write color data directly to color buffer in system memory 10 in accordance with the one or more graphics operations. GPU 12 may be further configured to write depth data to a depth buffer in the GMEM 14 in accordance with the one or more graphics operations, and resolve the depth buffer in GMEM 14 to the system memory 10 when the rendering of the one or more portions of the frame is complete.

Figure 2:
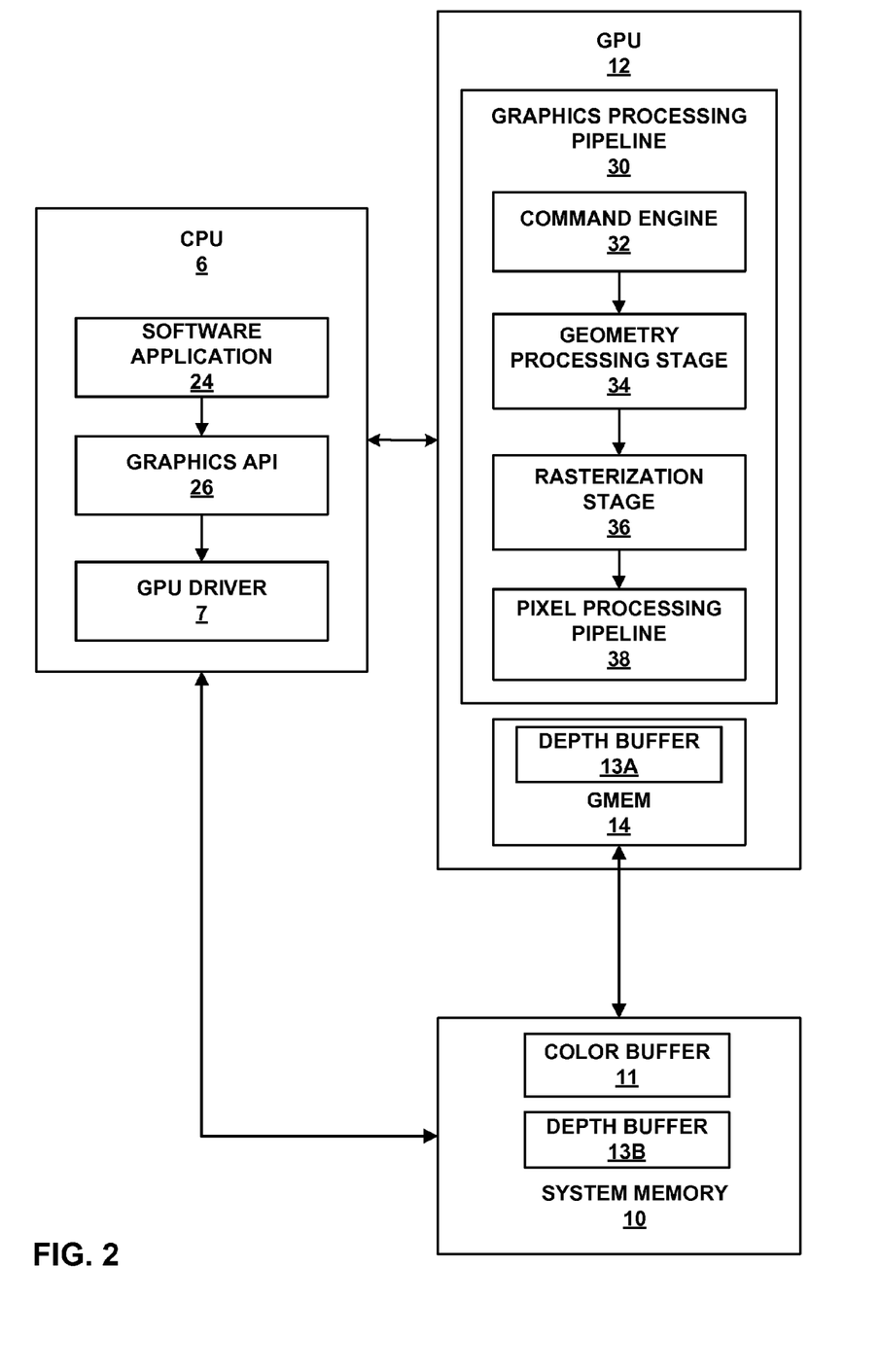
FIG. 2 is a block diagram showing example processing units configured to use the techniques of this disclosure.

FIG. 2 is a block diagram illustrating example implementations of CPU 6, GPU 12, and system memory 10 of FIG. 1 in further detail. CPU 6 may include at least one software application 24, a graphics API 26, and a GPU driver 7, each of which may be one or more software applications or services that execute on CPU 6. GPU 12 may include a graphics processing pipeline 30 that includes a plurality of graphics processing stages that operate together to execute graphics processing commands. GPU 12 may be configured to execute graphics processing pipeline 30 in a hybrid rendering mode, according to the techniques of this disclosure. As shown in FIG. 2, graphics processing pipeline 30 may include a command engine 32, a geometry processing stage 34, a rasterization stage 36, and a pixel processing pipeline 38. Each of the components in graphics processing pipeline 30 may be implemented as fixed-function components, programmable components (e.g., as part of a shader program executing on a programmable shader unit), or as a combination of fixed-function and programmable components. Memory available to CPU 6 and GPU 12 may include system memory 10 and frame buffer 15. Frame buffer 15 may be a part of system memory 10 or may be separate from system memory 10. Frame buffer 15 may store a frame of rendered image data.

As will be explained in more detail below, according to the techniques of the disclosure, GPU 12 may be configured to store color values in depth buffer 13A in GMEM 14. GPU 12 may be further configured to resolve depth buffer 13A to depth buffer 13B in system memory 10 when rendering of one or more portions of a frame (e.g., a bin) is complete. GPU 12 may be further configured to store color values in color buffer 11 directly in system memory 10 (i.e., without storing color values in GMEM 14).

Software application 24 may be any application that utilizes the functionality of GPU 12. For example, software application 24 may be a GUI application, an operating system, a portable mapping application, a computer-aided design program for engineering or artistic applications, a video game application, or another type of software application that uses 2D or 3D graphics.

Software application 24 may include one or more drawing instructions that instruct GPU 12 to render a graphical user interface (GUI) and/or a graphics scene. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software application 24 may invoke GPU driver 7, via graphics API 26, to issue one or more commands to GPU 12 for rendering one or more graphics primitives into displayable graphics images. For example, software application 24 may invoke GPU driver 7, via graphics API 26, to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like. Based on the instructions issued by software application 24 to GPU driver 7, GPU driver 7 may formulate one or more commands that specify one or more graphics operations for GPU 12 to perform in order to render the primitive. When GPU 12 receives a command from CPU 6, graphics processing pipeline 30 decodes the command and configures one or more processing elements within graphics processing pipeline 30 to perform the one or more graphics operations specified in the command. After performing the specified graphics operations, graphics processing pipeline 30 outputs the rendered data to frame buffer 15 associated with a display device.

In accordance with the techniques of this disclosure, GPU 12 may be configured to render one or more portions of a frame using pixel processing operations and one or more depth tests. The pixel processing operations may include graphics operations that use, change, update and/or generally manipulate color values for a pixel. The color values of a pixel may be in an RGB format (red, blue green), a YUV format (luma (Y), and two chroma values (UV)), or in any other format. GPU 12 may also execute depth tests (or other graphics operations) in order to use, change, update and/or generally manipulate depth values. Depth values may indicate how close a pixel is to a viewer relative to other pixels. Depth values may be used to determine what primitives are visible in the final rendered scene.

In accordance with the techniques of this disclosure, GPU 12 is configured to store color values directly to color buffer 11 in system memory 10. That is, GPU 12 updates color buffer 11 without writing to any color buffer in GMEM 14. GPU 12 may also be configured to store depth values in depth buffer 13A in GMEM 14 for one or more portions of a frame (e.g., a bin of a frame). When GPU 12 has finished rendering one or more portions of a frame (e.g., a bin of a frame), GPU 12 may resolve depth buffer 13A in GMEM 14 to depth buffer 13B in system memory 10.

GPU driver 7 may be further configured to compile one or more shader programs, and to download the compiled shader programs onto one or more programmable shader units contained within GPU 12. The shader programs may be written in a high level shading language, such as, e.g., an OpenGL Shading Language (GLSL), a High Level Shading Language (HLSL), a C for Graphics (Cg) shading language, etc. The compiled shader programs may include one or more instructions that control the operation of a programmable shader unit within GPU 12. For example, the shader programs may include vertex shader programs and/or pixel shader programs. A vertex shader program may control the execution of a programmable vertex shader unit or a unified shader unit, and include instructions that specify one or more per-vertex operations. A pixel shader program may include pixel shader programs that control the execution of a programmable pixel shader unit or a unified shader unit, and include instructions that specify one or more per-pixel operations. In accordance with some examples of this disclosure, a pixel shader program may also include instructions that selectively cause texture values to be retrieved for source pixels based on corresponding destination alpha values for the source pixels. GPU 12 may execute vertex shader and pixel shaders in accordance with the techniques of this disclosure. That is, any graphics operations performed by a pixel shader or a vertex shader that updates color values will cause GPU 12 to update color buffer 11 in system memory 10. Any graphics operations performed by a pixel shader or a vertex shader that updates depth values will cause GPU 12 to update depth buffer 13A in GMEM. Again, GPU 12 is configured to resolve depth buffer 13A to depth buffer 13B in system memory 10 in the portion of the frame being rendered by GPU 12 is complete.

Graphics processing pipeline 30 may be configured to receive one or more graphics processing commands from CPU 6, via graphics driver 28, and to execute the graphics processing commands to generate displayable graphics images. As discussed above, graphics processing pipeline 30 includes a plurality of stages that operate together to execute graphics processing commands. It should be noted, however, that such stages need not necessarily be implemented in separate hardware blocks. For example, portions of geometry processing stage 34 and pixel processing pipeline 38 may be implemented as part of a unified shader unit. Again, graphics processing pipeline 30 may be configured to execute in one of a plurality of different rendering modes, including a binning rendering mode and a direct rendering mode.

Command engine 32 may receive graphics processing commands and configure the remaining processing stages within graphics processing pipeline 30 to perform various operations for carrying out the graphics processing commands. The graphics processing commands may include, for example, drawing commands and graphics state commands. The drawing commands may include vertex specification commands that specify positional coordinates for one or more vertices and, in some instances, other attribute values associated with each of the vertices, such as, e.g., color coordinates, normal vectors, texture coordinates and fog coordinates. The graphics state commands may include primitive type commands, transformation commands, lighting commands, etc. The primitive type commands may specify the type of primitive to be rendered and/or how the vertices are combined to form a primitive. The transformation commands may specify the types of transformations to perform on the vertices. The lighting commands may specify the type, direction and/or placement of different lights within a graphics scene. Command engine 32 may cause geometry processing stage 34 to perform geometry processing with respect to vertices and/or primitives associated with one or more received commands.

Geometry processing stage 34 may perform per-vertex operations and/or primitive setup operations on one or more vertices in order to generate primitive data for rasterization stage 36. Each vertex may be associated with a set of attributes, such as, e.g., positional coordinates, color values, a normal vector, and texture coordinates. Geometry processing stage 34 modifies one or more of these attributes according to various per-vertex operations. For example, geometry processing stage 34 may perform one or more transformations on vertex positional coordinates to produce modified vertex positional coordinates. Geometry processing stage 34 may, for example, apply one or more of a modeling transformation, a viewing transformation, a projection transformation, a ModelView transformation, a ModelViewProjection transformation, a viewport transformation and a depth range scaling transformation to the vertex positional coordinates to generate the modified vertex positional coordinates.

In some instances, the vertex positional coordinates may be model space coordinates, and the modified vertex positional coordinates may be screen space coordinates. The screen space coordinates may be obtained after the application of the modeling, viewing, projection and viewport transformations. In some instances, geometry processing stage 34 may also perform per-vertex lighting operations on the vertices to generate modified color coordinates for the vertices. Geometry processing stage 34 may also perform other operations including, e.g., normal transformations, normal normalization operations, view volume clipping, homogenous division and/or backface culling operations.

Geometry processing stage 34 may produce primitive data that includes a set of one or more modified vertices that define a primitive to be rasterized as well as data that specifies how the vertices combine to form a primitive. Each of the modified vertices may include, for example, modified vertex positional coordinates and processed vertex attribute values associated with the vertex. The primitive data may collectively correspond to a primitive to be rasterized by further stages of graphics processing pipeline 30. Conceptually, each vertex may correspond to a corner of a primitive where two edges of the primitive meet. Geometry processing stage 34 may provide the primitive data to rasterization stage 36 for further processing.

In some examples, all or part of geometry processing stage 34 may be implemented by one or more shader programs executing on one or more shader units. For example, geometry processing stage 34 may be implemented, in such examples, by a vertex shader, a geometry shader or any combination thereof. In other examples, geometry processing stage 34 may be implemented as a fixed-function hardware processing pipeline or as a combination of fixed-function hardware and one or more shader programs executing on one or more shader units.

Rasterization stage 36 is configured to receive, from geometry processing stage 34, primitive data that represents a primitive to be rasterized, and to rasterize the primitive to generate a plurality of source pixels that correspond to the rasterized primitive. In some examples, rasterization stage 36 may determine which screen pixel locations are covered by the primitive to be rasterized, and generate a source pixel for each screen pixel location determined to be covered by the primitive. Rasterization stage 36 may determine which screen pixel locations are covered by a primitive by using techniques known to those of skill in the art, such as, e.g., an edge-walking technique, evaluating edge equations, etc. Rasterization stage 36 may provide the resulting source pixels to pixel processing pipeline 38 for further processing.

The source pixels generated by rasterization stage 36 may correspond to a screen pixel location, e.g., a destination pixel, and be associated with one or more color attributes. All of the source pixels generated for a specific rasterized primitive may be said to be associated with the rasterized primitive. The pixels that are determined by rasterization stage 36 to be covered by a primitive may conceptually include pixels that represent the vertices of the primitive, pixels that represent the edges of the primitive and pixels that represent the interior of the primitive.

Pixel processing pipeline 38 is configured to receive a source pixel associated with a rasterized primitive, and to perform one or more per-pixel operations on the source pixel. Per-pixel operations that may be performed by pixel processing pipeline 38 include, e.g., alpha test, texture mapping, color computation, pixel shading, per-pixel lighting, fog processing, blending, a pixel ownership text, a source alpha test, a stencil test, a depth test, a scissors test and/or stippling operations. In addition, pixel processing pipeline 38 may execute one or more pixel shader programs to perform one or more per-pixel operations. The resulting data produced by pixel processing pipeline 38 may be referred to herein as destination pixel data and stored in frame buffer 15. The destination pixel data may be associated with a destination pixel in frame buffer 15 that has the same display location as the source pixel that was processed. The destination pixel data may include data such as, e.g., color values in color buffer 11, destination alpha values, depth values in depth buffer 13B, etc.

Frame buffer 15 stores destination pixels for GPU 12. Each destination pixel may be associated with a unique screen pixel location. In some examples, frame buffer 15 may store color components and a destination alpha value for each destination pixel. For example, frame buffer 15 may store Red, Green, Blue, Alpha (RGBA) components for each pixel where the "RGB" components correspond to color values and the "A" component corresponds to a destination alpha value. Although frame buffer 15 and system memory 10 are illustrated as being separate memory units, in other examples, frame buffer 15 may be part of system memory 10.

As discussed above, GPU 12 may be configured to render one or more portions of a frame at one time. In some examples of the disclosure, GPU 12 may be configured to render an entire frame at once. In this example, GPU 12 would resolve depth buffer 13A in GMEM 14 when the entire frame is rendered. In other examples of the disclosure, GPU 12 may be configured to render only a portion of a frame at one time. That is, GPU 12 may be configured to divide a frame into regions called bins or tiles, and render each of the bins separately. In accordance with the techniques of this disclosure, GPU 12 may be configured to divide a frame into bins and store any depth values associated with rendering the bin in depth buffer 13A in GMEM 14. When rendering of the bin is complete, GPU 12 is configured to resolve depth buffer 13A to depth buffer 13B in system memory 10. However, GPU 12 is configured to directly store any color values related to rendering the bin in color buffer 11 in system memory 10.

In this regard, since color buffer 11 may be used for every bin in a frame, color buffer 11 may be configured with a memory size such that all color values of a frame will fit into color buffer 11. However, depth buffer 13A need only be configured with a size such that all depth values of a bin will fit into depth buffer 13A. Depth buffer 13B may be configured with a size such that all depth values of a frame will fit into depth buffer 13B. Additional details regarding binning will be discussed below.

Figure 3:
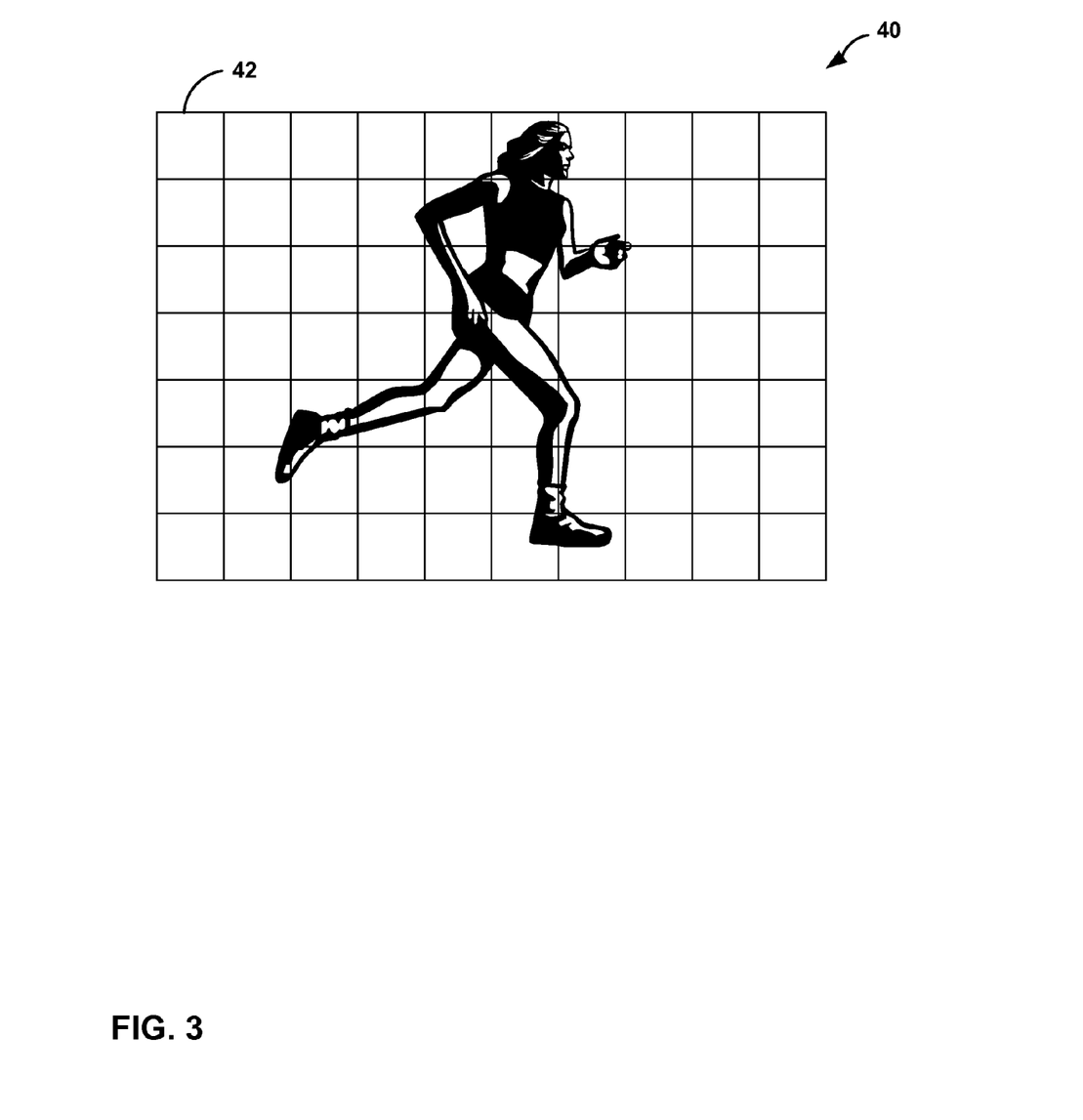
FIG. 3 is a conceptual diagram illustrating bins of a frame.

FIG. 3 is a conceptual diagram illustrating a frame divided into bins for binning rendering mode. Frame 40 may be divided into a plurality of bins, such as bin 42. Typically, the graphics hardware will contain fast memory (e.g., GMEM 14 of FIG. 2) that is of a size sufficient to hold at least one bin of data. According to examples of this disclosure, GMEM 14 may be configured with a size to hold one bin worth of depth data stored in depth buffer 13A.

As part of a single rendering pass for a particular bin of the frame, graphics processing pipeline 30 may render all or a subset of the batch of primitives with respect to a particular subset of the destination pixels (e.g., a particular bin of destination pixels) of the frame. After performing a first rendering pass with respect to a first bin, graphics processing pipeline 30 may perform a second rendering pass with respect to a second bin, etc. Graphics processing pipeline 30 may incrementally traverse through the bins until the primitives associated with every bin have been rendered.

Figure 4:
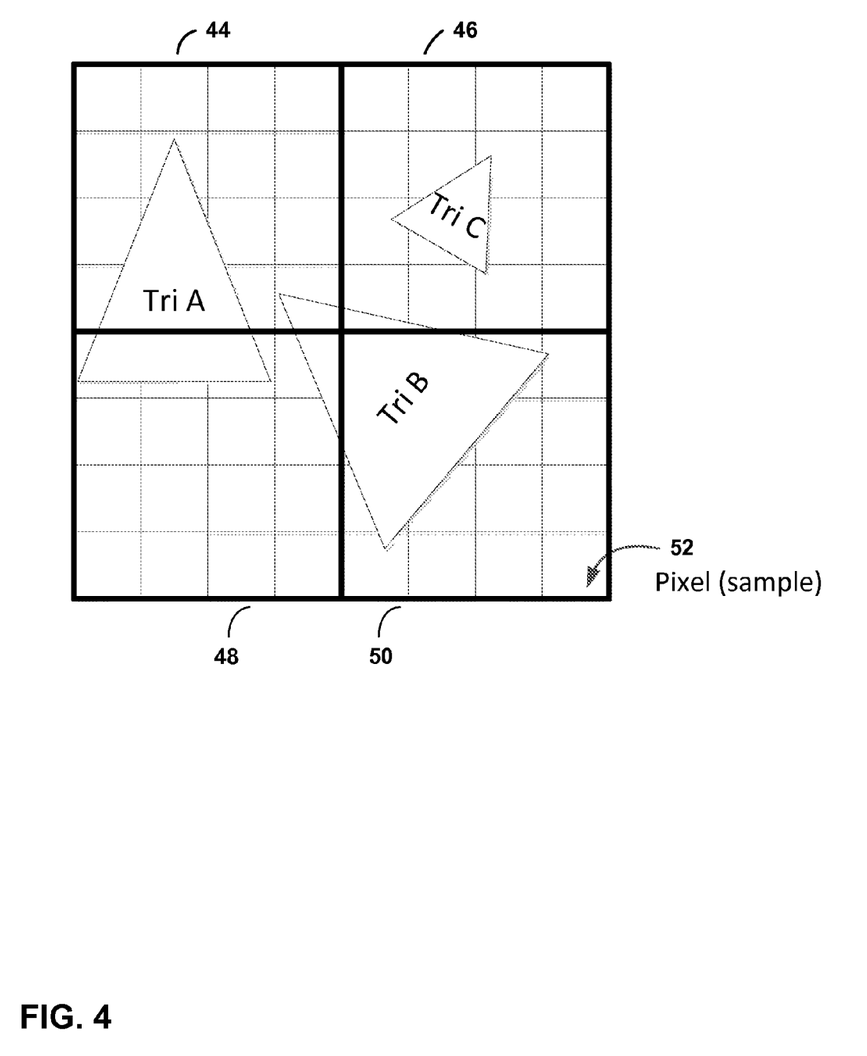
FIG. 4 is a conceptual diagram illustrating bins of a frame in more detail.

FIG. 4 is a conceptual diagram showing bins used in a hybrid rendering mode, according to the techniques of this disclosure, in more detail. Bins 44, 46, 48 and 50 are rendered/rasterized to contain multiple pixels 52. One or more graphics primitives may be visible in each bin. For example, portions of triangle A (Tri A) are visible in both bin 44 and bin 48. Portions of triangle B (Tri B) are visible in each of bin 44, bin 46, bin 48, and bin 50. Triangle C (Tri C) is only visible in bin 46. During a rendering pass, in one example of the disclosure, a scene is split into bins and all triangles that are in the bin are rendered (this is sometimes called software binning). In another example of the disclosure, GPU 12 performs an additional step before rendering to determine which triangles in the bin are actually visible in the final rendered scene (this is sometimes called hardware binning). For example, some triangles may be behind one or more other triangles and will not be visible in the final rendered scene. In this way, triangles that are not visible need not be rendered for that bin.

In accordance with the techniques of this disclosure, while performing a particular rendering pass, depth data for the bin associated with that particular rendering pass may be stored in depth buffer 13A in GMEM 14. However, pixel data for the bin associated with that particular rendering pass may be stored in color buffer 11 in system memory 10. After performing the rendering pass, GPU 12 may transfer (i.e., resolve) the contents of depth buffer 13A in GMEM 14 to depth buffer 13B in system memory 10. After transferring the contents of depth buffer 13A in GMEM 14 to depth buffer 13B in system memory 10, GPU 12 may initialize depth buffer 13A in GMEM 14 to default values and begin a subsequent rendering pass with respect to a different bin.

Figure 5:
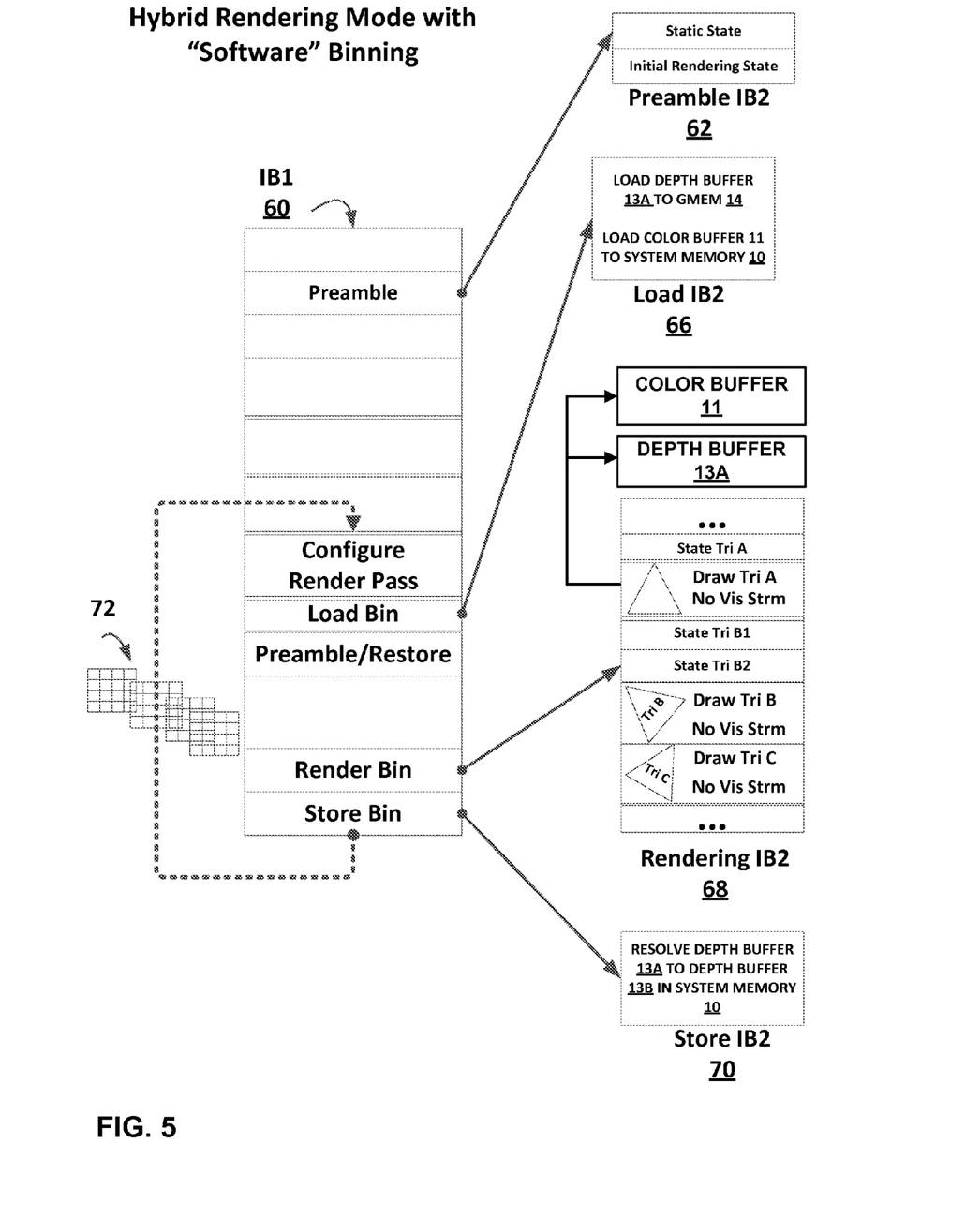
FIG. 5 is a conceptual diagram illustrating command buffers for a hybrid rendering mode using "software" binning according to the techniques of the disclosure.

FIG. 5 is a conceptual diagram showing an example command structure for rendering a scene using the hybrid rendering mode of this disclosure together with "software" binning techniques. Level 1 indirect buffer (IB1) 60 contains a series of execution commands for directing GPU 12 to perform the various steps of graphics processing pipeline 30 (i.e., to execute one or more graphics operations). Each execution command in IB1 60 is essentially a pointer into one or more level 2 indirect buffers (IB2) that contain commands for various aspects of the rendering pipeline. In this way, a two or more level structure is established for executing the graphics rendering pipeline. GPU 12 may sequentially step through each execution command in IB1 60, where each execution in IB1 60 points to a specific stack of commands stored in an IB2. IB1s and IB2s may be memory that is on-board GPU 12 or may be external memory to GPU 12, such as system memory 10.

The preamble execution command in IB1 60 points to a preamble IB2 62 that contains preamble commands that are executable by GPU 12. For example, preamble IB2 62 may include commands that initializes that static state of GPU 12 and sets the initial rendering state of GPU 12. The static state of GPU 12 includes settings that do not change based on the particular application. The rendering state, on the other hand, includes GPU settings that may change based on the particular application (e.g., an OpenGL application vs. a Direct X application). After the commands in the preamble IB2 are completed, control returns to IB1 60 to perform the next execution command.

The next execution command in IB1 60 configures the render pass for the rendering mode being employed. Again, in the example of FIG. 5, the rendering mode is the hybrid rendering mode of this disclosure using software binning. Next, the load bin execution command in IB1 60 points to the commands in load IB2 66. For software binning, depth data for a particular bin is loaded into depth buffer 13A in GMEM 14. In addition, color data for the particular bin is loaded into color buffer 11 in system memory 10. Control then passes back to IB1 60 and the render bin execution command points to commands in the rendering IB2.

Rendering IB2 68 consists of a series of state commands and draw commands for drawing the triangles in the loaded bin. Each draw command instructs GPU 12 to draw the triangle in accordance with a graphics processing pipeline 30 (e.g., including a geometry processing stage 34, a rasterization stage 36, and/or a pixel processing pipeline 38) established by the commands and/or GPU hardware. As shown in rendering IB2 68, each of the draw commands indicates that no visibility stream is used to determine if the specific triangles are actually visible in the bin. Visibility streams are generated in a binning rendering mode that uses "hardware" binning, and will be discussed in more detail with reference to FIG. 6.

The state commands in rendering IB2 68 affect the behavior of the graphics processing pipeline executed by GPU 12. For example, state commands may change the color, polygon mode (e.g., points instead of solids or lines), blending (on/off), depth testing (on/off), texturing (on/off), culling, clipping, and other logical operations. As shown in rendering IB2 68, state commands may be issued on a per triangle (or per primitive) basis. That is, the command "State Tri A" may affect the behavior of GPU 12 when drawing triangle A, while the "State Tri B1" and "State Tri B2" commands may affect the behavior of GPU 12 when drawing triangle B. The "State Tri B1" and "State Tri B2" commands merely indicate that multiple state commands may be executed for each triangle. Any rendering commands in rendering IB2 68 that update color values for pixels in the bin being rendered causes GPU 12 to update such color values in color buffer 11 in system memory 10. Any rendering commands in rendering IB2 68 that updates depth values for pixels in the bin being rendered causes GPU 12 to update depth buffer 13A in GMEM 14.

After all commands have been executed in rendering IB2 68 (e.g., after all triangles have been drawn), control returns to IB1 60. The store bin execution command may include a pointer to a store IB2 70 that includes a command to store (i.e., resolve) the depth values in depth buffer 13A in GMEM 14 to depth buffer 13B in system memory 10. The render pass (e.g., the execution commands from configure render pass to store bin as shown in IB1 60) is then repeated for each bin 72 for one or more frames.

Figure 6:
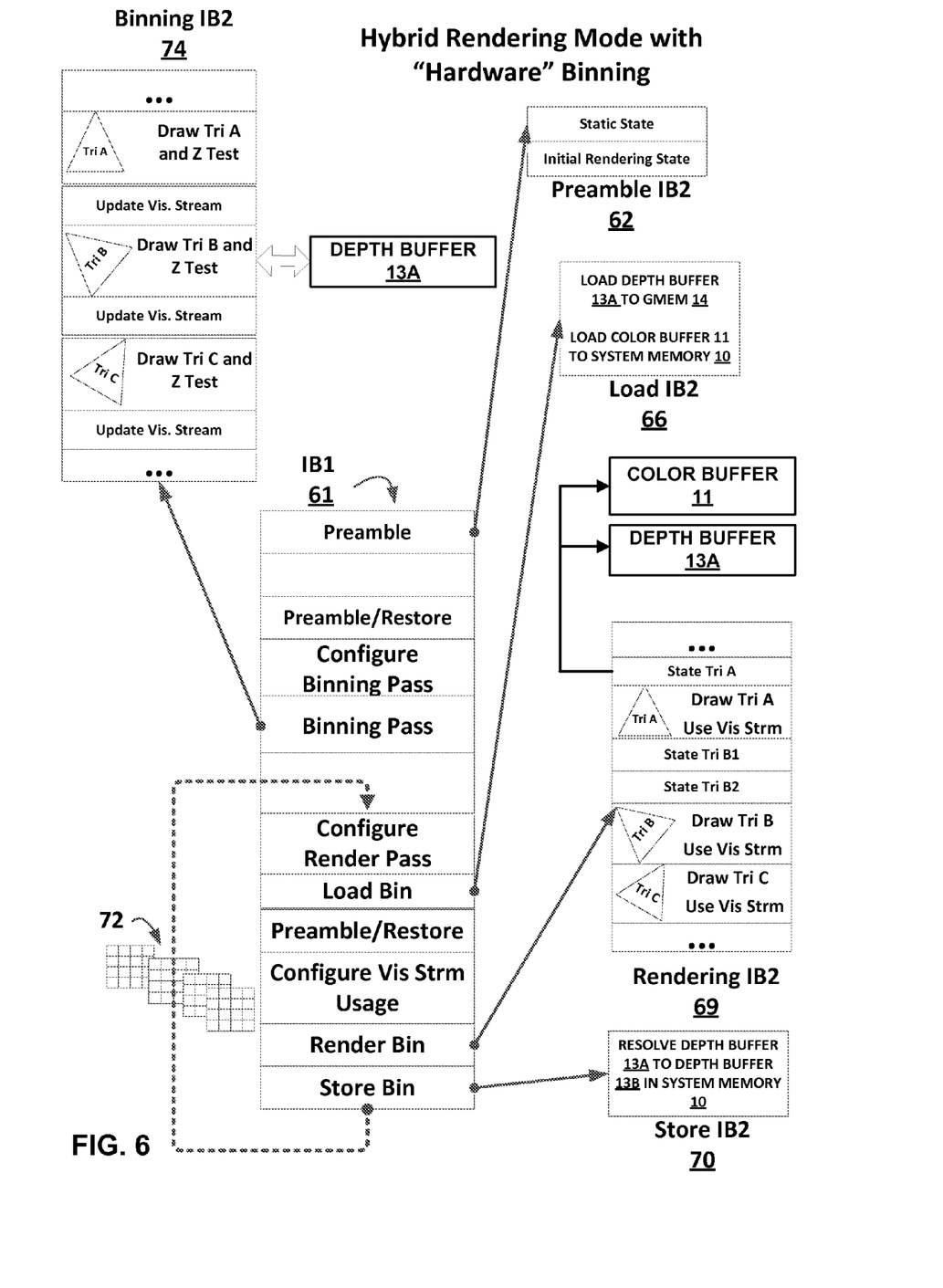
FIG. 6 is a conceptual diagram illustrating command buffers for a hybrid rendering mode using "hardware" binning according to the techniques of the disclosure.

FIG. 6 is a conceptual diagram showing an example command structure for rendering a scene using a binning rendering mode using "hardware" binning. The execution commands in IB1 61 are similar to those of IB1 60 of FIG. 6 with the exception of commands related to a "binning" pass. A "binning" pass is used to generate a visibility stream that indicates whether or not specific triangles in the bin are actually visible in the final rendered scene. For example, some triangles may be behind another triangle in the scene and will not be visible in some scenarios (e.g., when the triangle in front is opaque or when no blending is used). Before rendering bins 72, IB1 61 may include a binning pass execution command that points to commands in binning IB2 74. Binning IB2 74 includes commands that cause GPU 12 to perform a simplified version of a graphics pipeline (e.g., a simplified version of rendering IB2 69), but adds the step of updating a visibility stream for each triangle in the bin based on a depth test (Z test) that determines whether or not the triangle is visible in the final rendered scene. Binning IB2 74 may generate depth values when performing the binning pass, and may cause GPU 12 to update depth buffer 13A in GMEM 14.

The goal of the binning pass is to identify triangles that intersect the current bin. As such, only the position of the vertices of the triangle need to be determined to identify if a triangle intersects a particular bin. The binning pass utilizes a simplified vertex shader that only includes instructions that affect the position of the vertices. For example, color instructions, texture coordinates and other instructions that do not affect the position of triangle vertex may be removed from the simplified vertex shader used for the binning pass. The binning pass also uses coarse rasterization, rather than fine rasterization, to determine an approximate depth of each triangle. Coarse rasterization calculates a depth value at a lower precision (e.g., using a lower number of bits) than fine rasterization. Only approximate depth values are necessary to determine if a triangle is visible in the bin. Pixel shaders are not used in the binning pass.

The binning pass then utilizes a depth test on the coarse depth values to determine if a triangle is visible in the bin relative to other triangles in the bin. Based on this depth test, a visibility stream is updated. The visibility stream may be a string of bits that indicates whether or not a specific triangle in the rendered bin is visible (e.g., 1 indicates a triangle is visible, 0 indicates a triangle is not visible).

The commands in rendering IB2 69 are similar to those of rendering IB 68 in FIG. 5, but for the use of the visibility stream. Draw commands (e.g., Draw Tri A, Draw Tri B, Draw Tri C, etc.) in the rendering IB2 69 may use the visibility stream generated by the binning pass to determine whether or not it is necessary to draw a specific triangle. For example, drawing may be skipped for triangles indicated as not visible by the visibility stream.

Figure 7:
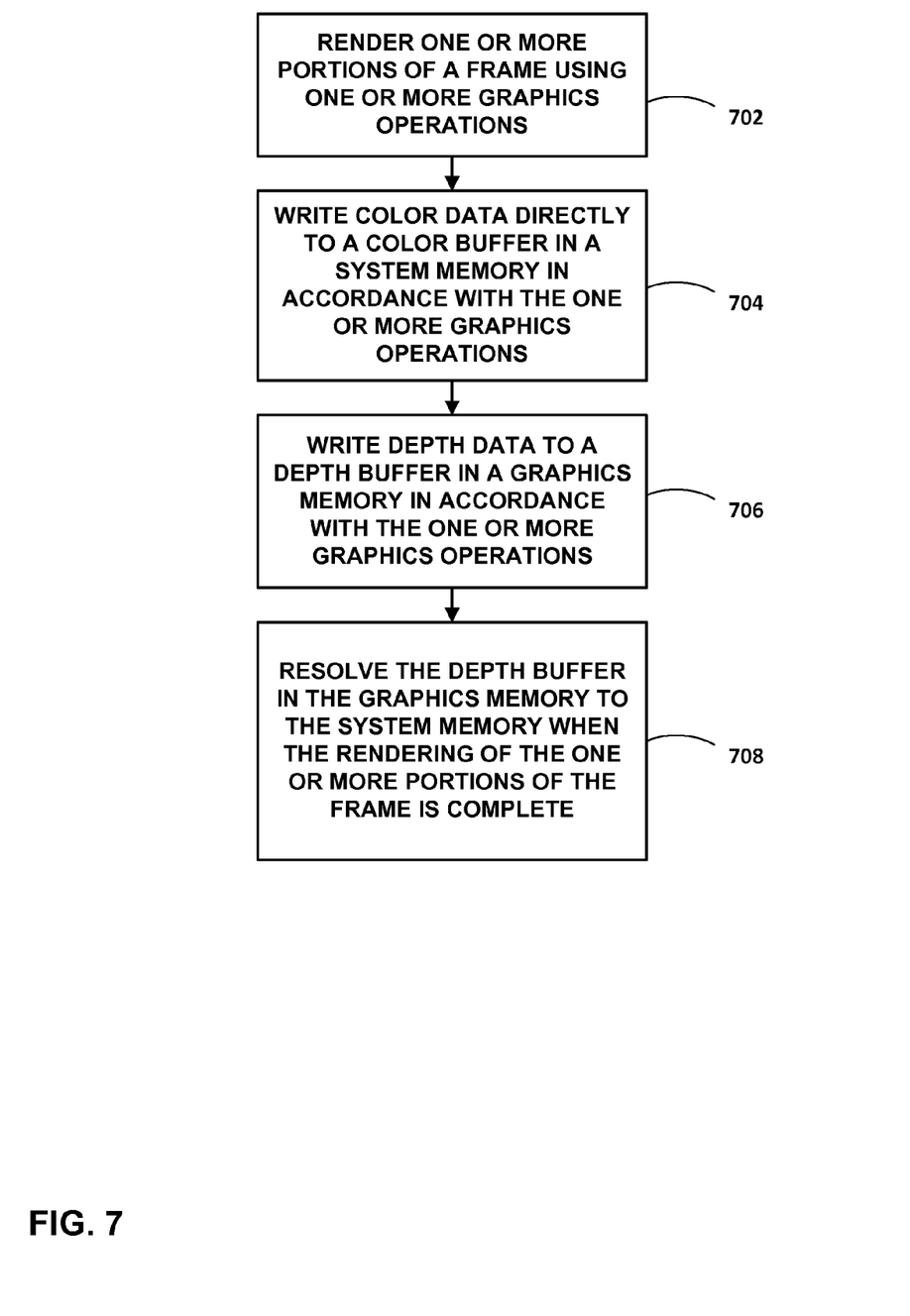
FIG. 7 is a flowchart illustrating a method according to one example of the disclosure.

FIG. 7 is a flowchart illustrating a method according to one example of the disclosure. The method of FIG. 13 may be performed by one or more hardware units of GPU 12. In one example of the disclosure GPU 12 may be configured to render one or more portions of the frame using one or more graphics operations (702). GPU 12 may be further configured to write color data directly to color buffer 11 in system memory 10 in accordance with the one or more graphics operations (704). GPU 12 may be still further configured to write depth data to depth buffer 13A in GMEM 14 in accordance with the one or more graphics operations (706), and resolve depth buffer 13A GMEM 14 to depth buffer 13B in system memory 10 when the rendering of the one or more portions of the frame is complete. In one example of the disclosure, system memory 10 may be DRAM, and GMEM 14 may be on a same integrated circuit as GPU 12.

In another example of the disclosure, GPU 12 may be configured to perform a binning pass on the one or more portions of the frame. The one or more portions of the frame may be a bin of the frame. In one example, to perform the binning pass, GPU 12 is further configured to perform a hardware binning pass identifying primitives that are visible in the bin. In this example GPU 12 may be further configured to render the bin of the frame using the one or more graphics operations on the primitives identified as being visible in the bin. In another example, GPU 12 is configured to perform a software binning pass identifying primitives that are within the bin, and to render the bin of the frame using the one or more graphics operations on the primitives identified as being within the bin.

In one or more examples, the functions described above may be implemented in hardware, software, firmware, or any combination thereof. If implemented in software, the functions may be stored as one or more instructions or code on an article of manufacture comprising a non-transitory computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more DSPs, general purpose microprocessors, ASICs, FPGAs, or other equivalent integrated or discrete logic circuitry. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of graphics processing, the method comprising:
   rendering, with a graphics processing unit (GPU), one or more portions of a frame using one or more graphics operations;
   writing, with the GPU, color data directly to a color buffer in a system memory in accordance with the one or more graphics operations;
   writing, with the GPU, depth data to a depth buffer in a graphics memory in accordance with the one or more graphics operations; and
   resolving, with the GPU, the depth buffer in the graphics memory to the system memory when the rendering of the one or more portions of the frame is complete.

2. The method of claim 1, further comprising:
   performing, with the GPU, a binning pass on the one or more portions of the frame.

3. The method of claim 2, wherein each of the one or more portions of the frame is a bin of the frame.

4. The method of claim 3, wherein performing the binning pass comprises performing a hardware binning pass identifying primitives that are visible in the bin, and
   wherein rendering the one or more portion of the frame using the one or more graphics operations comprises rendering the bin of the frame using the one or more graphics operations on the primitives identified as being visible in the bin.

5. The method of claim 3, wherein performing the binning pass comprises performing a software binning pass identifying primitives that are within the bin, and
   wherein rendering the one or more portions of the frame using the one or more graphics operations comprises rendering the bin of the frame using the one or more graphics operations on the primitives identified as being within the bin.

6. The method of claim 1, wherein the one or more portions of the frame is the entire frame.

7. The method of claim 1, wherein rendering the one or more portions of the frame using the one or more graphics operations comprises rendering the one or more portions of the frame using pixel processing operations and one or more depth tests, and
   wherein writing the color data directly to the color buffer in the system memory in accordance with the one or more graphics operations comprises writing the color data directly to the color buffer in the system memory in accordance with the pixel processing operations, and
   wherein writing the depth data to the depth buffer in the graphics memory in accordance with the one or more graphics operations comprises writing the depth data to the depth buffer in the graphics memory in accordance with the one or more depth tests.

8. The method of claim 1, wherein the system memory is dynamic random-access memory (DRAM), and wherein the graphics memory is on a same integrated circuit as the GPU.

9. An apparatus configured for graphics processing, the apparatus comprising:
   a graphics memory configured to store the graphics data; and
   a graphics processing unit (GPU) in communication with the system memory and the graphics memory, the GPU configured to:
   render one or more portions of the frame using one or more graphics operations;
   write color data directly to a color buffer in a system memory in accordance with the one or more graphics operations;
   write depth data to a depth buffer in the graphics memory in accordance with the one or more graphics operations; and
   resolve the depth buffer in the graphics memory to the system memory when the rendering of the one or more portions of the frame is complete.

10. The apparatus of claim 9, further comprising the system memory.

11. The apparatus of claim 10, wherein the system memory is dynamic random-access memory (DRAM), and wherein the graphics memory is on a same integrated circuit as the GPU.

12. The apparatus of claim 9, wherein the GPU is further configured to:
   perform a binning pass on the one or more portions of the frame.

13. The apparatus of claim 12, wherein each of the one or more portions of the frame is a bin of the frame.

14. The apparatus of claim 13, wherein to perform the binning pass, the GPU is further configured to perform a hardware binning pass identifying primitives that are visible in the bin, and
   wherein to render the one or more portion of the frame using the one or more graphics operations, the GPU is further configured to render the bin of the frame using the one or more graphics operations on the primitives identified as being visible in the bin.

15. The apparatus of claim 13, wherein to perform the binning pass, the GPU is further configured to perform a software binning pass identifying primitives that are within the bin, and
wherein to render the one or more portions of the frame using the one or more graphics operations, the GPU is further configured to render the bin of the frame using the one or more graphics operations on the primitives identified as being within the bin.

16. The apparatus of claim 9, wherein the one or more portions of the frame is the entire frame.

17. The apparatus of claim 9, wherein to render the one or more portions of the frame using the one or more graphics operations, the GPU is further configured to render the one or more portions of the frame using pixel processing operations and one or more depth tests, and
wherein to write the color data directly to the color buffer in the system memory in accordance with the one or more graphics operations, the GPU is further configured to write the color data directly to the color buffer in the system memory in accordance with the pixel processing operations, and
wherein to write the depth data to the depth buffer in the graphics memory in accordance with the one or more graphics operations, the GPU is further configured to write the depth data to the depth buffer in the graphics memory in accordance with the one or more depth tests.

18. The apparatus of claim 9, further comprising a display configured to display the frame.

19. The apparatus of claim 9, wherein the GPU and the graphics memory are part of a personal computer, a desktop computer, a laptop computer, a tablet computer, a computer workstation, a video game platform or console, a mobile telephone, a portable video game device, a personal music player, a video player, a display device, a television, a television set-top box, or a server.

20. An apparatus configured for graphics processing, the apparatus comprising:
means for rendering one or more portions of a frame using one or more graphics operations;
means for writing color data directly to a color buffer in a system memory in accordance with the one or more graphics operations;
means for writing depth data to a depth buffer in a graphics memory in accordance with the one or more graphics operations; and
means for resolving the depth buffer in the graphics memory to the system memory when the rendering of the one or more portions of the frame is complete.

21. The apparatus of claim 20, further comprising:
means for performing a binning pass on the one or more portions of the frame.

22. The apparatus of claim 21, wherein each of the one or more portions of the frame is a bin of the frame.

23. The apparatus of claim 22, wherein the means for performing the binning pass comprises means for performing a hardware binning pass identifying primitives that are visible in the bin, and
wherein the means for rendering the one or more portion of the frame using the one or more graphics operations comprises means for rendering the bin of the frame using the one or more graphics operations on the primitives identified as being visible in the bin.

24. The apparatus of claim 22, wherein the means for performing the binning pass comprises means for performing a software binning pass identifying primitives that are within the bin, and
wherein the means for rendering the one or more portions of the frame using the one or more graphics operations comprises means for rendering the bin of the frame using the one or more graphics operations on the primitives identified as being within the bin.

25. The apparatus of claim 20, wherein the one or more portions of the frame is the entire frame.

26. The apparatus of claim 20, wherein the means for rendering the one or more portions of the frame using the one or more graphics operations comprises means for rendering the one or more portions of the frame using pixel processing operations and one or more depth tests, and
wherein the means for writing the color data directly to the color buffer in the system memory in accordance with the one or more graphics operations comprises means for writing the color data directly to the color buffer in the system memory in accordance with the pixel processing operations, and
wherein the means for writing the depth data to the depth buffer in the graphics memory in accordance with the one or more graphics operations comprises means for writing the depth data to the depth buffer in the graphics memory in accordance with the one or more depth tests.

27. The apparatus of claim 20, wherein the system memory is dynamic random-access memory (DRAM), and wherein the graphics memory is on a same integrated circuit as the GPU.

28. A non-transitory computer-readable storage medium storing instructions that, when executed, cause one or more processors of a device configured for graphics processing to:
render one or more portions of the frame using one or more graphics operations;
write color data directly to a color buffer in a system memory in accordance with the one or more graphics operations;
write depth data to a depth buffer in a graphics memory in accordance with the one or more graphics operations; and
resolve the depth buffer in the graphics memory to the system memory when the rendering of the one or more portions of the frame is complete.

29. The non-transitory computer-readable storage medium of claim 28, wherein the instructions further cause the one more processors to:
perform a binning pass on the one or more portions of the frame.

30. The non-transitory computer-readable storage medium of claim 28, wherein to render the one or more portions of the frame using the one or more graphics operations, the instructions further cause the one more processors to render the one or more portions of the frame using pixel processing operations and one or more depth tests, and
wherein to write the color data directly to the color buffer in the system memory in accordance with the one or more graphics operations, the instructions further cause the one more processors to write the color data directly to the color buffer in the system memory in accordance with the pixel processing operations, and
wherein to write the depth data to the depth buffer in the graphics memory in accordance with the one or more graphics operations, the instructions further cause the one more processors to write the depth data to the depth buffer in the graphics memory in accordance with the one or more depth tests.

* * * * *